Figures 1, 2:
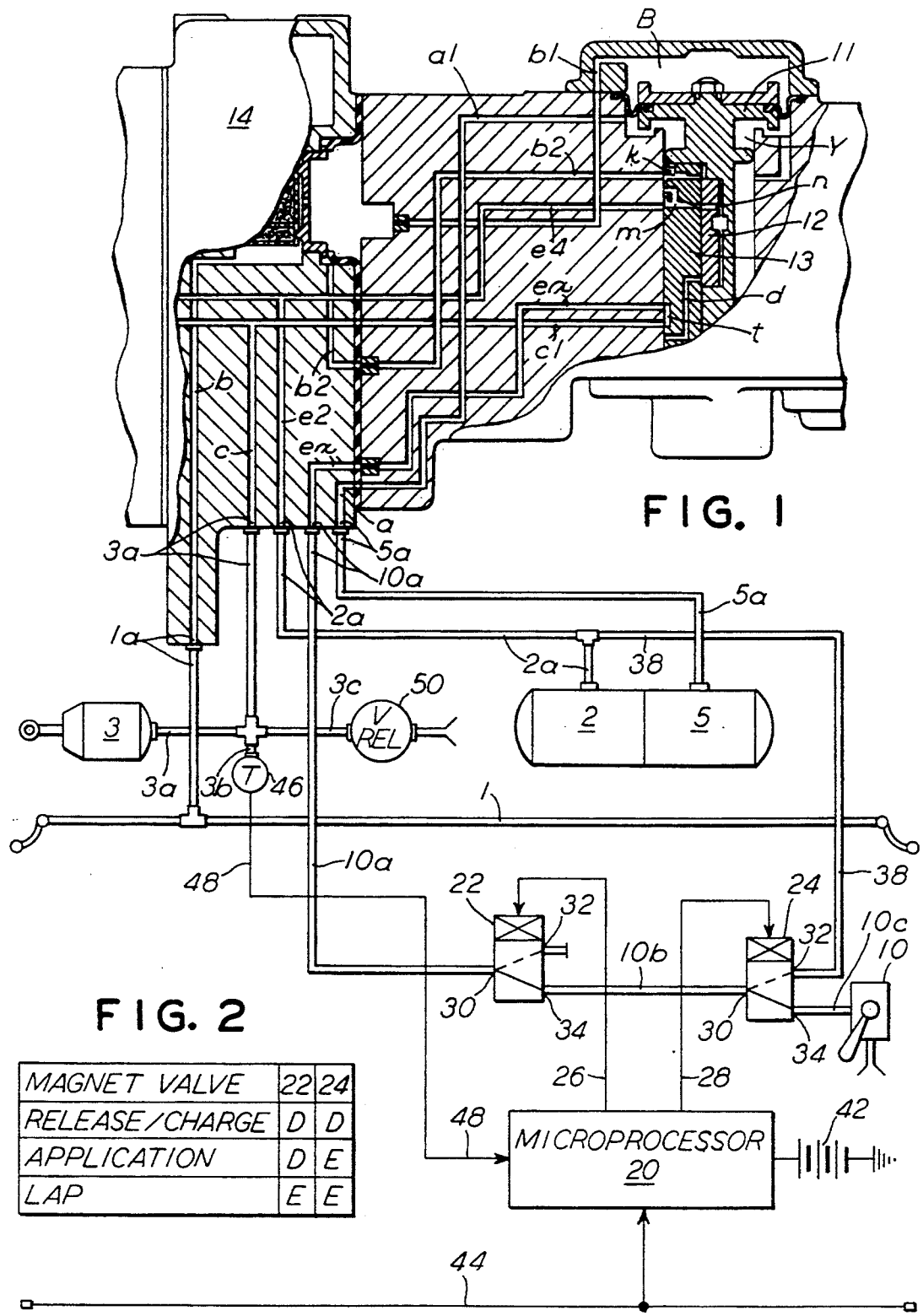

United States Patent [19]
Troiani et al.

[11] Patent Number: 5,393,129
[45] Date of Patent: Feb. 28, 1995

[54] ELECTRO-PNEUMATIC FREIGHT BRAKE CONTROL SYSTEM

[75] Inventors: Vincent F. Troiani, New Florence; Edward W. Gaughan, Irwin, both of Pa.

[73] Assignee: Westinghouse Air Brake Company, Wilmerding, Pa.

[21] Appl. No.: 209,893

[22] Filed: Mar. 14, 1994

[51] Int. Cl.$^6$ ............................................. B60T 13/70
[52] U.S. Cl. .......................................... 303/3; 303/15; 303/86; 303/29; 364/426.01
[58] Field of Search .................. 303/3, 15, 9, 29, 35, 303/44, 50, 54, 86; 364/426.01

[56] References Cited

U.S. PATENT DOCUMENTS

| | | | |
|---|---|---|---|
| 4,344,138 | 8/1982 | Frasier | 364/426.01 |
| 4,904,027 | 2/1990 | Skantar et al. | 303/15 |
| 4,978,179 | 12/1990 | Balukin | 303/86 X |
| 5,020,862 | 6/1991 | Balukin et al. | 303/86 X |
| 5,064,251 | 11/1991 | Romansky | 303/3 |
| 5,090,780 | 2/1992 | Powell | 303/15 |
| 5,222,788 | 6/1993 | Dimsa et al. | 303/15 |
| 5,286,096 | 2/1994 | Ferri et al. | 303/15 |

OTHER PUBLICATIONS

DeLeon et al., Electro-Pneumatic Brakes and Other Concepts Being Developed at the University of New Hampshire, Aug. 1992.

*Primary Examiner*—Robert J. Oberleitner
*Assistant Examiner*—Lee W. Young
*Attorney, Agent, or Firm*—Gary J. Falce

[57] ABSTRACT

An electro-pneumatic brake system for a railroad freight car is integrated with the existing pneumatic freight brake system by utilizing the air stored in the emergency reservoir to supply brake cylinder pressure via the exhaust passage of the pneumatic control valve, which is maintained in release position during electro-pneumatic brake operation. The electro-pneumatic brake system fails to a release mode, so that the brakes on an individual car that experiences a power loss do not apply. In the case of a power loss in the electro-pneumatic system, due to a train break-in-two, the pneumatic brake system is automatically operated by the consequent loss of brake pipe pressure to provide a back-up brake, while at the same time interrupting the control valve exhaust path via which the electro-pneumatic brake is communicated with the brake cylinder.

10 Claims, 1 Drawing Sheet

| MAGNET VALVE | 22 | 24 |
|---|---|---|
| RELEASE/CHARGE | D | D |
| APPLICATION | D | E |
| LAP | E | E |

ELECTRO-PNEUMATIC FREIGHT BRAKE CONTROL SYSTEM

BACKGROUND OF THE INVENTION

The present invention relates to a brake control system for railroad freight cars and in particular to such a brake control system that integrates electro-pneumatic control of the brake with the conventional automatic pneumatic brake control.

From the inception of the early Westinghouse air brake, until the present time, compressed air has been employed as the medium by which brake control signals have been transmitted through a train of railroad freight cars, as well as the force by which friction retardation is applied through brake shoes that engage the car wheel treads during braking. As the size of freight cars has increased to provide greater load carrying capacity, and the number of cars capable of being hauled in a train has likewise grown, there have been continued improvements in the air brake system to make it more efficient, in order to provide better stopping ability consistent with the greater demands placed on the air brake system.

Electro-pneumatic brake control systems are known to extend the capability of the air brake beyond that which is achieved with the conventional automatic pneumatic brake control system presently employed. These improved capabilities are possible due primarily to the fact that the brake control signal can be transmitted instantaneously to each car in the train, whereas propagation of a pneumatic control signal is limited to a value approaching the speed of sound. by instantaneously transmitting a brake control signal to each car of a train, not only is the time required to initiate braking action on all of the cars reduced, but in-train forces, due to disproportionate brake buildup timing between the cars, are better controlled. This permits greater brake force to be employed to achieve shorter stop distance without incurring damage to car lading and couplers, and without creating the potential for a train derailment.

The present automatic pneumatic brake control system is fail-safe in the sense that a train break-in-two will result in an emergency brake application on both halves of the separated train without any initiative on the part of the locomotive engineer. Electro-pneumatic brakes also offer the possibility of fail-safe operation. By appropriately configuring the electro-pneumatic valves in the brake cylinder and exhaust piping, brake pressure is obtained in a de-energized state. A fail-safe application of the electro-pneumatic brakes may not be desirable, however, where loss of power to the electro-pneumatic valves results not from a train break-in-two, but from an electrical malfunction on an individual car, since the brakes on such an individual car would be applied while the train continued to run. This could lead to thermal wheel damage, prematurely worn brake shoes, burned brake heads and possible derailment. On the other hand, fail-safe application of the brakes must be provided for in the event of a power failure that affects all of the cars, such as where a break-in-two occurs.

SUMMARY OF THE INVENTION

The object of the present invention, therefore, is to provide an electro-pneumatic brake system that operates in conjunction with a back-up pneumatic brake system in such a manner that the back-up pneumatic brake will become effective to automatically override the electro-pneumatic brake when a loss of power occurs due to a train break-in-two without becoming effective when an individual car or cars experience a power loss.

It is another object of the invention to integrate an electro-pneumatic brake control with the existing railroad freight car control valve in a manner that requires only a minimum of additional equipment when modifying a railroad freight car for electro-pneumatic braking in accordance with the foregoing objective.

Still another object of the invention is to provide an integrated pneumatic/electro-pneumatic brake control system that maintains the existing pneumatic brake functionality and compatibility when employed with a train having cars that may not be equipped with electro-pneumatic controlled brakes.

In accordance with the foregoing objectives, there is provided for a railroad freight car an integrated pneumatic/electro-pneumatic brake control system in which electro-pneumatic control means is arranged between a supply reservoir and the exhaust port of a conventional railroad car control valve device, which is normally stabilized in a release and charging position under control of brake pipe pressure that is normally maintained at the train running pressure to maintain the supply reservoir charged. In this charging and release position of the car control valve device, a first fluid flow path is established between the car brake cylinder device and the control valve exhaust port via which the electro-pneumatic control means is effective to regulate the brake cylinder pressure. In the event of a train break-in-two, such that brake pipe pressure is depleted, the car control valve device is operated to an emergency position in which the aforementioned first flow path is interrupted and a second fluid flow path is established between the brake cylinder and the supply reservoir in bypass of the electro-pneumatic means to provide a back-up automatic pneumatic brake application.

These and other objects and advantages of the invention will become apparent from the following explanation when taken in conjunction with the accompanying drawings in which:

FIG. 1 is a partial diagrammatic view of a conventional pneumatic freight brake control valve device with which an electro-pneumatic brake control system shown in block diagram form is operatively combined; and FIG. 2 is a chart showing the status of the application and release magnet valves in different operating conditions of the electro-pneumatic brake system.

DESCRIPTION AND OPERATION

Referring to the drawing, there is shown a partial view of a conventional ABD, ABDW or ABDX type brake control valve device 14, such as may be employed on a railroad freight car. Typically, such railroad freight cars include in addition to a brake pipe 1, a brake cylinder 3, an emergency reservoir 2, an auxiliary reservoir 5, and a retainer valve 10. The ends of brake pipe 1 are provided with flexible hose and couplings (not shown) for connecting with the counterpart hose and couplings on adjacent ends of an adjoining freight car in a railroad train. As is well known, brake pipe 1 is charged with compressed air stored in the main reservoirs on the locomotive of the aforementioned railroad train, the pressure in brake pipe 1 being maintained at a predetermined running pressure when the locomotive brake valve (not shown) is set in release position.

As is also well known, control valve device 14 is set in its release and charging position, as shown, in response to the pressure in brake pipe 1 being increased, such as when charging the system and when releasing a previous brake application. In this release and charging position of control valve device 14, compressed air is connected from brake pipe 1 to auxiliary reservoir 5 via branch pipe and port 1a, passage b, passage b2, a passage k in slide valve 13 of the service piston 11, a chamber Y under the service piston diaphragm, passage a1, passage a, and supply port and pipe 5a. In turn, compressed air is also connected from chamber Y to the emergency reservoir 2 via passage n in the service piston graduating valve 12, a passage m in slide valve 13, passages e4, e2, and supply port and pipe 2a. Concurrently with the aforementioned charging, brake cylinder device 3 is vented to atmosphere via pipe and delivery port 3a, passages c, c1, slot t in slide valve 13, passage ex, port and pipe 10a, and a pressure retainer valve 10.

Being conventional, the foregoing pneumatic brake control system is capable of providing service and emergency brake applications in accordance with a reduction in brake pipe pressure at appropriate rates in a well-known manner.

Integrated with the above-explained pneumatic brake control system is an electro-pneumatic brake control system including a microprocessor unit 20, an application magnet valve 22 and a release magnet valve 24. These magnet valves 22, 24 are solenoid operated, spring returned, 3-way, pneumatic valves, the respective solenoid operators being connected by wires 26, 28 to microprocessor unit 20. Each magnet valve has an inlet 30 and a pair of outlets 32, 34, inlet 30 of magnet valve 22 being connected to exhaust pipe 10a, and outlet port 32 of magnet valve 24 being connected to emergency reservoir 2 via a pipe 38 and pipe 2a. A pipe 10b is connected between outlet 34 of magnet valve 22 and inlet 30 of magnet valve 24. Outlet 32 of magnet valve 22 is blanked, while outlet 34 of magnet valve 24 is connected to retainer valve 10 via pipe 10c.

Electrical power for the microprocessor unit 20 and the solenoid operators of the respective magnet valves may be provided by an on-car battery 42, while a control wire 44, that is interconnected by suitable connectors (not shown) to a corresponding control wire of an adjoining car (not shown) forms a train line to conduct brake control signals from the locomotive to microprocessor unit 20. Connected via a pipe 3b to brake cylinder pipe 3a is a pressure transducer 46 that provides feedback information corresponding to the instantaneous brake cylinder pressure to the microprocessor unit via wire 48. Also connected to brake cylinder pipe 3a via a pipe 3c is a pressure relief valve 50.

Under normal electro-pneumatic operation, the brake cylinder pressure is under control of the magnet valves 22, 24, which are shown in a de-energized condition consistent with the absence of a signal at control wire 44 during the above explained charging of the pneumatic brake system, as can be seen from the chart of FIG. 2. This accommodates venting of brake cylinder 3 during charging of the pneumatic brake system, via the car retainer valve 10. Since control valve device 14 is in release and charging position, as shown and described in response to charging of brake pipe 1, slide valve 13 is positioned by service piston 11 such that slot t connects passages ex and c1 to establish an exhaust path through control valve device 14. Accordingly, brake cylinder 3 is vented to atmosphere via pipe and port 3a, the aforementioned exhaust path including passages c, c1, slot t, passage ex, port and pipe 10a, and interconnected ports 30, 34 of magnet valve 24.

When a brake application is desired, a control signal is conducted over wire 44, which is evaluated by microprocessor unit 20 in terms of the brake cylinder pressure feedback signal received via wire 48. Since brake cylinder pressure is exhausted due to the venting thereof during charging, as above-mentioned, a difference exists between the control and feedback signals indicative of the desired level of brake application. Microprocessor unit 20 responds to this signal difference to energize magnet valve 24 and maintain magnet valve 22 de-energized, as shown in the chart of FIG. 2 for an application condition. Inlet port 30 of magnet valve 24 is thus cut off from the vent connection at port 34 and is instead connected to outlet port 32. Emergency reservoir pressure is thus connected to brake cylinder 3 via pipes 2a and 38, release magnet valve 24, pipe 10b, application magnet valve 22, exhaust pipe and port 10a, the control valve exhaust path including passage ex, slot t in service piston slide valve 13, and passages c1 and c, and port and pipe 3a.

When brake cylinder pressure, as reflected by transducer 46, provides a feedback signal to microprocessor 20 corresponding to the desired brake application according to the signal at control wire 44, magnet valve 22 will become energized via wire 26, while magnet valve 24 remains energized via wire 28 as shown in the chart of FIG. 2 for a lap condition. At magnet valve 22, inlet port 30 is disconnected from outlet port 34 and is connected to blanked inlet port 32, thus interrupting further supply of emergency reservoir pressure to brake cylinder 3. Should brake cylinder pressure leak off, so as to fall below a level corresponding to the desired brake application, microprocessor 20 will cause magnet valve 22 to be de-energized to re-establish the emergency reservoir supply path to brake cylinder 3. In this manner the desired brake cylinder pressure is maintained until a further increase or decrease in the brake application is desired.

The brake cylinder pressure may be released in graduated increments by reducing the control wire signal accordingly. When the control wire signal is less than the feedback signal, microprocessor unit 20 operates to de-energize both magnet valves 22 and 24. In the de-energized condition of magnet valves 22 and 24, as previously explained for charging brake pipe 1, the brake cylinder pressure is released to atmosphere via retainer valve 10. If only a partial release is desired, the control wire signal is only partially reduced to allow the brake cylinder pressure feedback signal to drop below the control wire signal and thereby cause microprocessor 20 to terminate the venting of brake cylinder pressure by establishing a lap condition of the magnet valves 22 and 24.

It will be appreciated that during this time that the brakes are being applied and released under control of the electro-pneumatic brake system, brake pipe 1 will continue to be maintained at its predetermined running pressure, and control valve device 14 will accordingly remain in release and charging position to maintain the pressure in auxiliary reservoir 5 and emergency reservoir 2 charged to the predetermined running pressure established in brake pipe 1. In this manner, continued graduated releases and re-application of the brakes can be made without exhausting the supply of compressed air stored in emergency reservoir 2.

In the event a power failure occurs, due to a dead battery 42, a malfunction of the microprocessor 20, or a faulty solenoid of the respective magnet valves 22 and 24, both magnet valves will automatically revert to a de-energized condition, thereby effecting a release of any brake application that might exist at the time. In that such a condition of power failure would of course only occur on an individual car basis, as opposed to the entire train of cars, the percentage of brake reduction would be relatively inconsequential in terms of a train of cars.

On the other hand, should a power loss occur due to a train break-in-two, in consequence of which event the train brake pipe 1 breaks, control valve device 1 responds to the resultant reduction of brake pipe pressure to effect an emergency brake application, which will be propagated through all of the cars in both halves of the separated train to bring the train to a safe stop. Such development of brake cylinder pressure under control of control valve device 14 occurs irrespective of the fact that the magnet valves 22 and 24 are arranged to fail to a release condition, as explained. This is possible since in application position, control valve device 14 interrupts the aforementioned vent path to which application and release magnet valves 22 and 24 are connected in the shown release and charging position of control valve device 14. This is accomplished by reason of the service piston moving to application position in response to the reduction of brake pipe pressure, whereby service slide valve 13 is accordingly re-located to cause slot t to cut off communication between passages ex and c1, while concurrently a passage d in slide valve 13 makes a connection between chamber y and passage c1. In this manner, the control valve exhaust path is interrupted to isolate brake cylinder 3 from atmosphere via de-energized magnet valves 22 and 24 and auxiliary reservoir pressure is connected to brake cylinder 3 via pipe and ports 5a, passage a and a1, chamber y, slide valve passage d, passages c1 and c, and port and pipe 3a. Concurrently, the pressure in emergency reservoir 2 is also connected to brake cylinder 3 through the high pressure valve in the control valve emergency portion (not shown), and passage c to provide an additional source of compressed air, which, combined with the compressed air provided by auxiliary reservoir 5, establishes a higher emergency brake pressure than is obtained during a full service application, in accordance with the conventional, well-known operation of ABD, ABDW and ABDX type control valves.

Pressure relief valve 50 is provided to prevent an over-charge condition of brake cylinder 3 from developing when making an emergency on top of an electro-pneumatic application, since any air taken out of emergency reservoir to supply the brake cylinder during an electro-pneumatic application is continually replenished so that full emergency reservoir pressure, as well as auxiliary reservoir pressure is always available regardless of the existing brake cylinder pressure.

If it is desired to operate the brakes pneumatically to provide a "limp-in" brake following the aforementioned break-in-two emergency, for example, or for any other reason, the control signal transmitted via control were 44 is regulated to cause microprocessor 20 to maintain magnet valves 22, 24 deenergized. This establishes the normal venting of exhaust pipe 10a via magnet valves 22, 24 and retainer valve 10. Consequently, brake cylinder pressure may be applied and released under brake pipe control in the usual, well-known manner, with retainer valve 10 being available to provide grade bake control.

We claim:

1. An integrated pneumatic/electro-pneumatic brake control system for a railroad car comprising:
   a) a brake pipe charged with fluid under pressure;
   b) a first reservoir;
   c) a brake cylinder device;
   d) a pneumatic control valve device having a control port to which said brake pipe is connected, a first supply port to which said first reservoir is connected, a delivery port to which said brake cylinder device is connected, and an exhaust port, said control port being communicated with said first supply port and said delivery port being communicated with said exhaust port in a first position to which said control valve device is operated in response to an increase in said brake pipe fluid pressure;
   e) electro-pneumatic valve means between said first reservoir and said exhaust port; and
   f) control means for operating said electro-pneumatic valve means such as to establish fluid pressure communication between said first reservoir and said exhaust port when an electro-pneumatic brake application is desired and to vent said exhaust port when a release of said brake application is desired.

2. A brake control system as recited in claim 1, wherein said control valve device is operative to a second position in which said communication of said control port with said first supply port and said communication of said delivery port with said exhaust port is interrupted, and said delivery port is communicated with said first supply port.

3. A brake control system as recited in claim 1, wherein said control means comprises:
   a) a source of electrical power;
   b) means for providing an electrical control signal according to said desired electro-pneumatic brake application and release;
   c) pressure transducer means for providing an electrical feedback signal representative of the fluid pressure effective at said brake cylinder device; and
   d) means operative in response to said control signal and said feedback signal for establishing and interrupting a connection of electrical power between said source and said electro-pneumatic valve means.

4. A brake control signal as recited in claim 3, wherein said means operative in response to said control signal and said feedback signals is a microprocessor.

5. A brake control system as recited in claim 3, wherein said electro-pneumatic valve means comprises:
   a) first and second solenoid-operated, spring-returned magnet valves, said first magnet valve having a first port connected to said exhaust port of said control valve device, a second port that is blanked and a third port, said second magnet valve having a first port to which said third port of said first magnet valve is connected, a second port connected to said first reservoir, and a third port that is vented;
   b) said first and second ports of each said first and second magnet valve being communicated in an energized condition thereof and said first and third ports of each said first and second magnet valve being communicated in a de-energized condition thereof.

6. A brake control system as recited in claim 5, wherein said first and second magnet valves are de-energized when said feedback signal is greater than said control signal.

7. A brake control system as recited in claim 2, further comprising:
a) a second reservoir; and
b) said control valve device having a second supply port to which said second reservoir is connected, said second supply port being communicated with said control port in said first position of said control valve device and cut off therefrom in said second position of said control valve device.

8. A brake control system as recited in claim 7, wherein said control valve device is operative to said second position in response to a decrease in said brake pipe fluid pressure to establish fluid pressure communication between said delivery port and at least one of said first and second reservoirs.

9. A braked control system as recited in claim 8, further comprising pressure relief valve means for releasing fluid under pressure from said brake cylinder device in excess of a predetermined amount.

10. A brake control system as recited in claim 5, further comprising a retainer valve device to which said third port of said second magnetic valve is connected.

* * * * *